(12) United States Patent
Nam et al.

(10) Patent No.: US 9,041,871 B2
(45) Date of Patent: May 26, 2015

(54) DISPLAY DEVICE INCLUDING A LENS MODULE

(71) Applicants: Hui Nam, Yongin (KR); Beom-Shik Kim, Yongin (KR)

(72) Inventors: Hui Nam, Yongin (KR); Beom-Shik Kim, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 159 days.

(21) Appl. No.: 13/719,731

(22) Filed: Dec. 19, 2012

(65) Prior Publication Data

US 2014/0055693 A1 Feb. 27, 2014

(30) Foreign Application Priority Data

Aug. 24, 2012 (KR) .................. 10-2012-0092830

(51) Int. Cl.
*G02F 1/1335* (2006.01)
*G02B 27/22* (2006.01)
*H04N 13/04* (2006.01)
*G09G 3/36* (2006.01)

(52) U.S. Cl.
CPC .......... *G02B 27/22* (2013.01); *G02F 1/133526* (2013.01); *G02B 27/2214* (2013.01); *H04N 13/0404* (2013.01); *H04N 13/042* (2013.01); *H04N 13/0497* (2013.01); *G09G 3/36* (2013.01)

(58) Field of Classification Search
CPC ................................................ G02F 1/133526
USPC ............................................................. 349/15
See application file for complete search history.

(56) References Cited

U.S. PATENT DOCUMENTS

| 7,609,445 | B2 | 10/2009 | Hamagishi | |
|---|---|---|---|---|
| 8,842,064 | B2 * | 9/2014 | Robinson | 345/102 |
| 2009/0052027 | A1 | 2/2009 | Yamada et al. | |
| 2013/0176203 | A1 * | 7/2013 | Yun et al. | 345/156 |
| 2013/0208020 | A1 * | 8/2013 | Jung et al. | 345/690 |
| 2014/0118648 | A1 * | 5/2014 | Yoon et al. | 349/37 |
| 2014/0204292 | A1 * | 7/2014 | Liao et al. | 349/15 |

FOREIGN PATENT DOCUMENTS

JP 08-327948 A 12/1996

* cited by examiner

*Primary Examiner* — Timothy L Rude
(74) *Attorney, Agent, or Firm* — Lee & Morse, P.C.

(57) ABSTRACT

A display device includes a display panel including a plurality of pixels arranged in a matrix form, each pixel including a plurality of sub-pixels, a lens module on the display panel, the lens module including a plurality of lenses having a pitch that corresponds to a horizontal pitch of the plurality of sub-pixels, and a driving unit configured to drive the display panel and the lens module to provide an image displayed by the display panel to a left eye of a viewer at a first frame and to provide the image displayed by the display panel to a right eye of the viewer at a second frame.

19 Claims, 11 Drawing Sheets

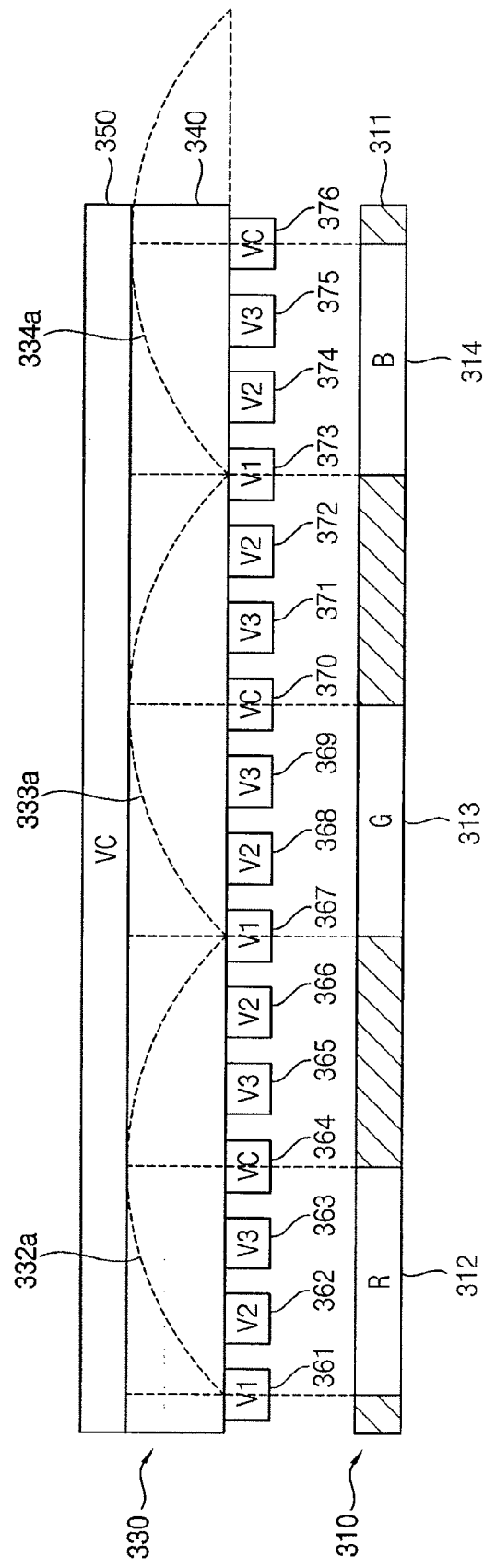

DISPLAY DEVICE INCLUDING A LENS MODULE

CROSS-REFERENCE TO RELATED APPLICATION

This application claims priority under 35 U.S.C. §119 to Korean Patent Application No. 2012-0092830, filed on Aug. 24, 2012, the disclosure of which is hereby incorporated by reference herein in its entirety.

BACKGROUND

1. Field

Example embodiments of the inventive concept relate to display devices. More particularly, example embodiments of the inventive concept relate to display devices that display stereoscopic images in a time-division manner by using lens modules.

2. Description of the Related Art

Recently, a three-dimensional display device displaying a stereoscopic image has been researched and developed. The three-dimensional display device may display the stereoscopic image by providing different images to a left eye and a right eye of a viewer with or without glasses.

SUMMARY

Example embodiments provide a display device that displays a stereoscopic image with a high resolution by using a lens module.

According to one aspect of example embodiments, there is provided a display device including a display panel, a lens module and a driving unit. The display panel includes a plurality of pixels arranged in a matrix form. Each pixel includes a plurality of sub-pixels. The lens module on the display panel includes a plurality of lenses having a pitch that corresponds to a horizontal pitch of the plurality of sub-pixels. The driving unit drives the display panel and the lens module to provide an image displayed by the display panel to a left eye of a viewer at a first frame and to provide the image displayed by the display panel to a right eye of the viewer at a second frame.

In example embodiments, the driving unit may include a display driving unit configured to drive the display panel to display a left eye image at the first frame, and to drive the display panel to display a right eye image at the second frame, and a lens module control unit configured to control the lens module such that each sub-pixel is located at a left portion of a corresponding one of the plurality of lenses at the first frame, and to control the lens module such that each sub-pixel is located at a right portion of the corresponding one of the plurality of lenses at the second frame.

In example embodiments, the lens module may include a liquid crystal layer including a plurality of liquid crystal molecules, a first electrode disposed on a first surface of the liquid crystal layer, and a plurality of second electrodes disposed on a second surface of the liquid crystal layer, the plurality of second electrodes extending in a column direction of the display panel.

In example embodiments, a ratio of a number of columns of the plurality of sub-pixels to a number of the plurality of second electrodes may be 1:2.

In example embodiments, a lens driving voltage may be applied to odd-numbered electrodes of the plurality of second electrodes at the first frame, and may be applied to even-numbered electrodes of the plurality of second electrodes at the second frame.

In example embodiments, a ground voltage may be applied to the first electrode and the even-numbered electrodes of the plurality of second electrodes at the first frame, and may be applied to the first electrode and the odd-numbered electrodes of the plurality of second electrodes at the second frame.

In example embodiments, the lens driving voltage may periodically transition from a positive high voltage to a negative high voltage or from the negative high voltage to the positive high voltage.

In example embodiments, a ratio of a number of columns of the plurality of sub-pixels to a number of the plurality of second electrodes may be 1:N, where N is an integer greater than 1.

In example embodiments, the plurality of second electrodes may include at least one third electrode located corresponding to a first side of each sub-pixel, at least one fourth electrode located corresponding to a second side of each sub-pixel, and at least one fifth electrode located between the at least one third electrode and the at least one fourth electrode. At the first frame, a lens driving voltage may be applied to the at least one third electrode, a ground voltage may be applied to the at least one fourth electrode, and a voltage higher than the ground voltage and lower than the lens driving voltage may be applied to the at least one fifth electrode. At the second frame, the ground voltage may be applied to the at least one third electrode, the lens driving voltage may be applied to the at least one fourth electrode, and the voltage higher than the ground voltage and lower than the lens driving voltage may be applied to the at least one fifth electrode.

In example embodiments, the plurality of sub-pixels may be arranged such that a long side of each sub-pixel extends in a column direction of the display panel and a short side of each sub-pixel extends in a row direction of the display panel.

In example embodiments, the plurality of sub-pixels may be arranged such that a long side of each sub-pixel extends in a row direction of the display panel and a short side of each sub-pixel extends in a column direction of the display panel.

In example embodiments, each of the plurality of pixels may include a red sub-pixel including an organic light emitting diode that emits red light, a green sub-pixel including an organic light emitting diode that emits green light, and a blue sub-pixel including an organic light emitting diode that emits blue light.

In example embodiments, each of the plurality of pixels may include a red sub-pixel including a first organic light emitting diode that emits white light and a red filter, a green sub-pixel including a second organic light emitting diode that emits white light and a green filter, and a blue sub-pixel including a third organic light emitting diode that emits white light and a blue filter.

In example embodiments, each of the plurality of pixels may include a red sub-pixel including a first organic light emitting diode that emits white light and a red filter, a green sub-pixel including a second organic light emitting diode that emits white light and a green filter, a blue sub-pixel including a third organic light emitting diode that emits white light and a blue filter, and a white sub-pixel including a fourth organic light emitting diode that emits white light.

According to another aspect of example embodiments, there is provided a display device including a display panel, a lens module, a display driving unit and a lens module control unit. The display panel includes a plurality of pixels arranged in a matrix form. Each pixel includes a plurality of sub-pixels. The lens module on the display panel includes a liquid crystal layer including a plurality of liquid crystal molecules, a first electrode disposed on a first surface of the liquid crystal layer, and a plurality of second electrodes disposed on a second surface of the liquid crystal layer, the plurality of second electrodes extending in a column direction of the display panel. The display driving unit drives the display panel to display a left eye image at a first frame, and to drive the display panel to display a right eye image at a second frame. The lens module control unit applies a lens driving voltage to electrodes located corresponding to first sides of the plurality of sub-pixels among the plurality of second electrodes, and applies the lens driving voltage to electrodes located corresponding to second sides of the plurality of sub-pixels among the plurality of second electrodes.

In example embodiments, the lens module control unit may control the lens module such that the lens module has a plurality of lenses having a pitch corresponding to a horizontal pitch of the plurality of sub-pixels.

In example embodiments, a ratio of a number of columns of the plurality of sub-pixels to a number of the plurality of second electrodes may be 1:N, where N is an integer greater than 1.

In example embodiments, the plurality of sub-pixels may be arranged such that a long side of each sub-pixel extends in a column direction of the display panel and a short side of each sub-pixel extends in a row direction of the display panel.

In example embodiments, the plurality of sub-pixels may be arranged such that a long side of each sub-pixel extends in a row direction of the display panel and a short side of each sub-pixel extends in a column direction of the display panel.

BRIEF DESCRIPTION OF THE DRAWINGS

Example embodiments can be understood in more detail from the following description taken in conjunction with the accompanying drawings, in which:

FIG. 6A is a diagram for describing an operation of a lens module included in a display device at a first frame in accordance with example embodiments;

DETAILED DESCRIPTION

Figure 1:
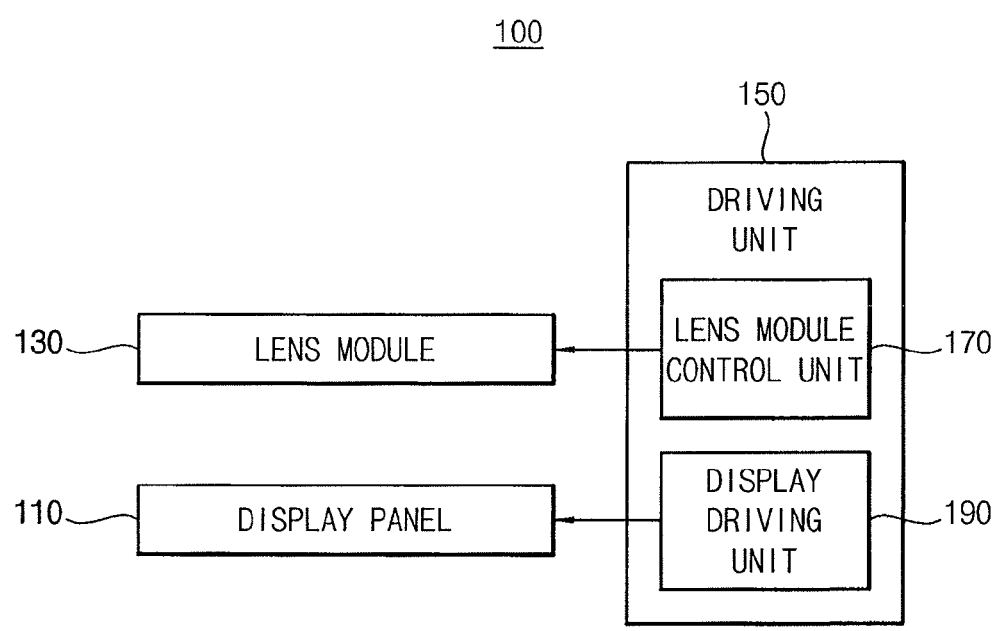
FIG. 1 is a block diagram illustrating a display device in accordance with example embodiments.

The example embodiments are described more fully hereinafter with reference to the accompanying drawings. The inventive concept may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like or similar reference numerals refer to like or similar elements throughout. As used herein, the term "and/or" includes any and all combinations of one or more of the associated listed items.

It will be understood that, although the terms first, second, third etc. may be used herein to describe various elements, components, regions, layers, patterns and/or sections, these elements, components, regions, layers, patterns and/or sections should not be limited by these terms. These terms are only used to distinguish one element, component, region, layer pattern or section from another region, layer, pattern or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross sectional illustrations that are schematic illustrations of illustratively idealized example embodiments (and intermediate structures) of the inventive concept. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a display device in accordance with example embodiments.

Referring to FIG. 1, a display device 100 includes a display panel 110, a lens module 130, and a driving unit 150.

The display panel 110 includes a plurality of pixels arranged in a matrix form. Each pixel may include a plurality of sub-pixels. In some example embodiments, the plurality of sub-pixels may be arranged such that a long side of each sub-pixel extends in a column direction of the display panel 110 and a short side of each sub-pixel extends in a row direction of the display panel 110. In other example embodiments, the plurality of sub-pixels may be arranged such that the long side of each sub-pixel extends in the row direction of the display panel 110 and the short side of each sub-pixel extends in the column direction of the display panel 110. In some example embodiments, each pixel may be an RGB pixel including a red sub-pixel having an organic light emitting diode that emits red light, a green sub-pixel having an organic light emitting diode that emits green light, and a blue sub-pixel having an organic light emitting diode that emits blue light. In other example embodiments, each pixel may be a WOLED pixel including a red sub-pixel having a first organic light emitting diode that emits white light and a red filter, a green sub-pixel having a second organic light emitting diode that emits white light and a green filter, and a blue sub-pixel having a third organic light emitting diode that emits white light and a blue filter. In still other example embodiments, each pixel may be an RGBW pixel including a red sub-pixel having a first organic light emitting diode that emits white light and a red filter, a green sub-pixel including a second organic light emitting diode that emits white light and a green filter, a blue sub-pixel including a third organic light emitting diode that emits white light and a blue filter, and a white sub-pixel including a fourth organic light emitting diode that emits white light.

The lens module 130 is disposed on the display panel 110. The lens module 130 may include a plurality of lenses having a pitch, e.g., a horizontal pitch, corresponding to a horizontal pitch of the plurality of sub-pixels. For example, the horizontal pitch of the lenses may equal the horizontal pitch of the sub-pixels. For example, the plurality of lenses may extend in a column direction of the display panel 110, and may be disposed parallel to each other. For example, the lenses may be cylindrical lenses. Each lens may be disposed corresponding to one column of the sub-pixels. Thus, the number of the plurality of lenses may be the same as the number of columns of the sub-pixels. Here, the pitch of the plurality of lenses means a distance from a point of one lens to a corresponding point of another lens that is directly adjacent to the one lens, and the horizontal pitch of the plurality of sub-pixels means a distance from a point of one sub-pixel to a corresponding point of another sub-pixel that is directly adjacent to the one sub-pixel in a horizontal direction (or a row direction). For example, the pitch of the plurality of lenses may be a distance between center points of two adjacent lenses, and the horizontal pitch of the plurality of sub-pixels may be a distance between two center points of two horizontally adjacent sub-pixels.

The driving unit 150 may drive the display panel 110 and the lens module 130 to provide an image displayed by the display panel 110 to a left eye of a viewer at a first frame (e.g., an odd-numbered frame) and to provide the image displayed by the display panel 110 to a right eye of the viewer at a second frame (e.g., an even-numbered frame). The driving unit 150 may include a display driving unit 190 for driving the display panel 110 and a lens module control unit 170 for driving the lens module 130.

The display driving unit 190 may drive the display panel 110 to display a left eye image at the first frame and to display a right eye image at the second frame. For example, the display driving unit 190 may include a scan driver for turning on or off thin film transistors (TFTs) formed on the display panel 110, and a data driver for applying a data signal corresponding to an image to be displayed to the display panel 110.

The lens module control unit 170 may control the lens module 130 such that each sub-pixel is located at a left portion of a corresponding one of the plurality of lenses at the first frame, and is located at a right portion of the corresponding one of the plurality of lenses at the second frame. Accordingly, the left eye image displayed by the display device 110 may be provided to the left eye of the viewer at the first frame, and the right eye image displayed by the display device 110 may be provided to the right eye of the viewer at the subsequent second frame.

In a conventional display device that displays a stereoscopic image using a lens module, one lens may be disposed corresponding to at least two columns of sub-pixels. Therefore, an image displayed by sub-pixels at one of the two columns is provided to a left eye, and an image displayed by sub-pixels at the other of the two columns is provided to a right eye. However, in the display device 100 according to example embodiments, since one lens is disposed corresponding to, e.g., only, one column of the sub-pixels, an image displayed by all sub-pixels may be provided to either the left eye or the right eye. Accordingly, the display device 100 according to example embodiments may have a resolution twice as high as a resolution of the conventional display device.

Figure 2A:
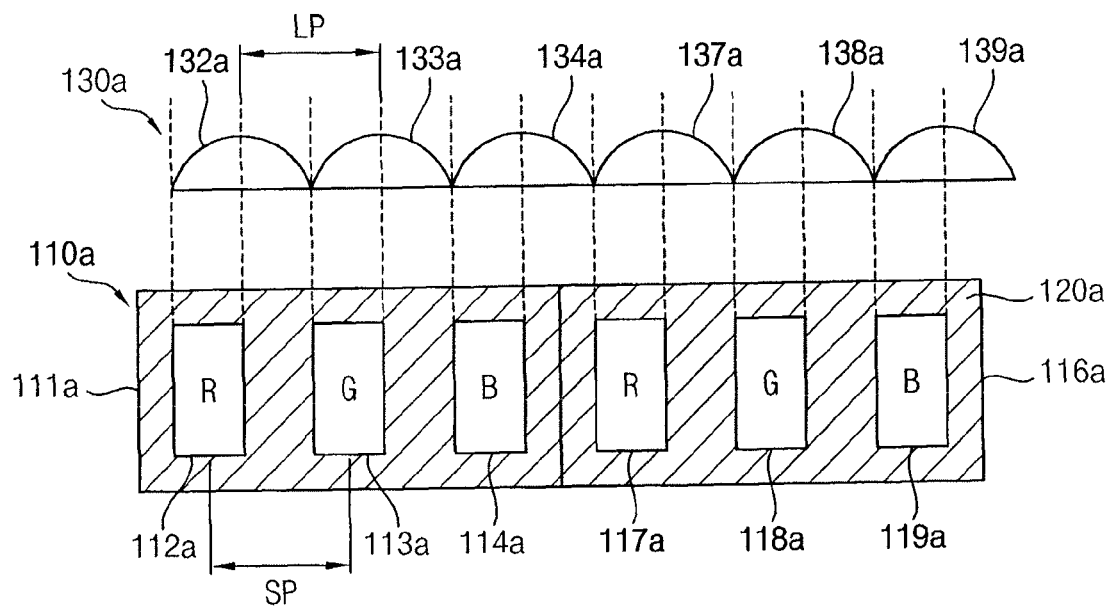
FIG. 2A is a diagram for describing an operation of a display device at a first frame in accordance with example embodiments.
Figure 2B:
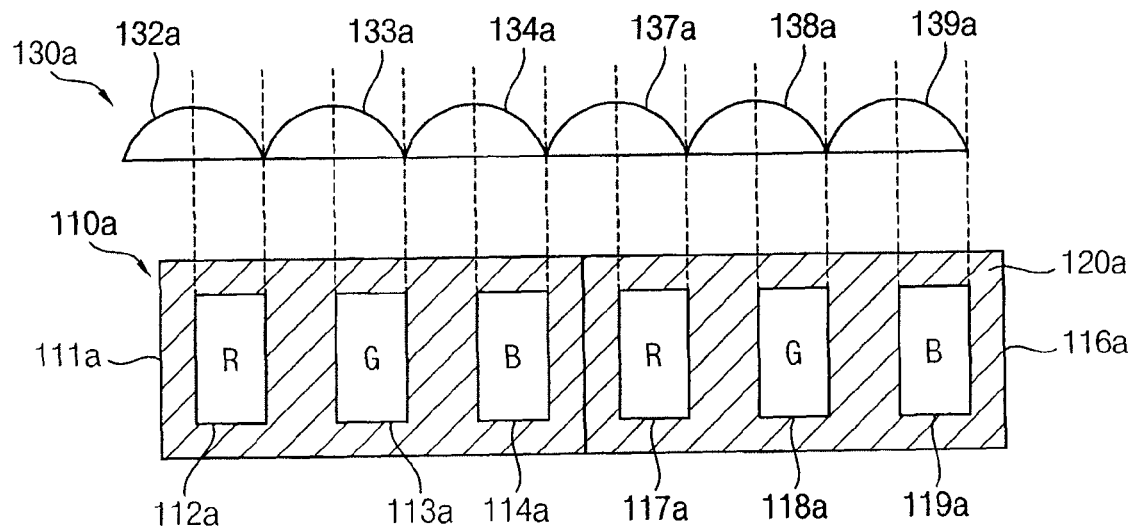
FIG. 2B is a diagram for describing an operation of a display device at a second frame in accordance with example embodiments.

FIG. 2A is a diagram for describing an operation of a display device at a first frame in accordance with example embodiments, and FIG. 2B is a diagram for describing an operation of a display device at a second frame in accordance with example embodiments.

Referring to FIGS. 2A and 2B, a display panel 110a may include a plurality of pixels 111a and 116a. Although only two pixels 111a and 116a are illustrated in FIG. 2A for convenience of description, the display panel 110a may include a plurality of pixels arranged in a matrix form having a plurality of rows and a plurality of columns. Each of the pixels 111a and 116a may include a respective red sub-pixel 112a and 117a having an organic light emitting diode that emits red light, a respective green sub-pixel 113a and 118a having an organic light emitting diode that emits green light, and a respective blue sub-pixel 114a and 119a having an organic light emitting diode that emits blue light.

The display panel 110a may further include a black matrix region 120a outside the sub-pixels 112a, 113a, 114a, 117a, 118a, and 119a. The black matrix region 120a may be a non-light-emitting region at which data lines, scan lines, power supply voltage lines, etc. are disposed.

For example, a long side of each sub-pixel 112a, 113a, 114a, 117a, 118a, and 119a may extend in a column direction of the display panel 110a, and a short side of each sub-pixel 112a, 113a, 114a, 117a, 118a, and 119a may extend in a row direction of the display panel 110a. For example, a horizontal pitch SP of the sub-pixels may correspond to a sum of a gap between two horizontally adjacent sub-pixels (i.e., a length of the black matrix region 120a between two horizontally adjacent sub-pixels) and a length of the short side of one sub-pixel. In some example embodiments, the gap between two horizontally adjacent sub-pixels may be substantially the same as the length of the short side of one sub-pixel, or may be longer than the length of the short side of one sub-pixel.

The lens module 130a may include a plurality of lenses 132a, 133a, 134a, 137a, 138a, and 139a. The plurality of lenses 132a, 133a, 134a, 137a, 138a, and 139a may extend in the column direction of the display panel 110a, and may be disposed parallel to each other. A pitch LP of the lenses may be substantially the same as the horizontal pitch SP of the sub-pixels, and one lens 132a, 133a, 134a, 137a, 138a, and 139a may be disposed corresponding to the sub-pixels 112a, 113a, 114a, 117a, 118a, and 119a. For example, a first lens 132a may be disposed on a column at which a first red sub-pixel 112a is located, a second lens 133a may be disposed on a column at which a first green sub-pixel 113a is located, and a third lens 134a may be disposed on a column at which a first blue sub-pixel 114a is located. Further, a fourth lens 137a may be disposed on a column at which a second red sub-pixel 117a is located, a fifth lens 138a may be disposed on a column at which a second green sub-pixel 118a is located, and a sixth lens 139a may be disposed on a column at which a second blue sub-pixel 119a is located. For example, the plurality of lenses 132a, 133a, 134a, 137a, 138a, and 139a may be arranged to contact each other, and a width of each lens along a horizontal direction may equal a sum of a width of one sub-pixel and a distance between two adjacent sub-pixels. For example, each lens may be positioned to overlap one corresponding sub-pixel and a distance between two adjacent sub-pixels.

At a first frame (e.g., at an odd-numbered frame), as illustrated in FIG. 2A, positions of the plurality of lenses 132a, 133a, 134a, 137a, 138a, and 139a may be adjusted such that each sub-pixel 112a, 113a, 114a, 117a, 118a, and 119a is located at a left portion of a corresponding one of the plurality of lenses 132a, 133a, 134a, 137a, 138a, and 139a. For example, a position of the first lens 132a may be adjusted such that the first red sub-pixel 112a is located at a left portion of the first lens 132a, a position of the second lens 133a may be adjusted such that the first green sub-pixel 113a is located at a left portion of the second lens 133a, and a position of the third lens 134a may be adjusted such that the first blue sub-pixel 114a is located at a left portion of the third lens 134a. Further, a position of the fourth lens 137a may be adjusted such that the second red sub-pixel 117a is located at a left portion of the fourth lens 137a, a position of the fifth lens 138a may be adjusted such that the second green sub-pixel 118a is located at a left portion of the fifth lens 138a, and a position of the sixth lens 139a may be adjusted such that the second blue sub-pixel 119a is located at a left portion of the sixth lens 139a. As described above, the sub-pixels 112a, 113a, 114a, 117a, 118a, and 119a may be located at the left portions of the plurality of lenses 132a, 133a, 134a, 137a, 138a, and 139a, and thus an image display by all the sub-pixels 112a, 113a, 114a, 117a, 118a, and 119a may be provided to a left eye of a viewer.

At a second frame (e.g., at an even-numbered frame), as illustrated in FIG. 2B, positions of the plurality of lenses 132a, 133a, 134a, 137a, 138a, and 139a may be adjusted such that each sub-pixel 112a, 113a, 114a, 117a, 118a, and 119a is located at a right portion of a corresponding one of the plurality of lenses 132a, 133a, 134a, 137a, 138a, and 139a. For example, the position of the first lens 132a may be adjusted such that the first red sub-pixel 112a is located at a right portion of the first lens 132a, a position of the second lens 133a may be adjusted such that the first green sub-pixel 113a is located at a right portion of the second lens 133a, and a position of the third lens 134a may be adjusted such that the first blue sub-pixel 114a is located at a right portion of the third lens 134a. Further, a position of the fourth lens 137a may be adjusted such that the second red sub-pixel 117a is located at a right portion of the fourth lens 137a, a position of the fifth lens 138a may be adjusted such that the second green sub-pixel 118a is located at a right portion of the fifth lens 138a, and a position of the sixth lens 139a may be adjusted such that the second blue sub-pixel 119a is located at a right portion of the sixth lens 139a. As described above, the sub-pixels 112a, 113a, 114a, 117a, 118a and 119a may be located at the right portions of the plurality of lenses 132a, 133a, 134a, 137a, 138a, and 139a, and thus the image display by all the sub-pixels 112a, 113a, 114a, 117a, 118a, and 119a may be provided to a right eye of the viewer.

As described above, in a display device according to example embodiments, the plurality of lenses 132a, 133a, 134a, 137a, 138a, and 139a may have the pitch LP corresponding to the horizontal pitch SP of the sub-pixels 112a, 113a, 114a, 117a, 118a, and 119a, and the positions of the plurality of lenses 132a, 133a, 134a, 137a, 138a, and 139a may be adjusted per frame. Accordingly, the display device according to example embodiments may display a stereoscopic image with a high resolution.

Figure 3A:
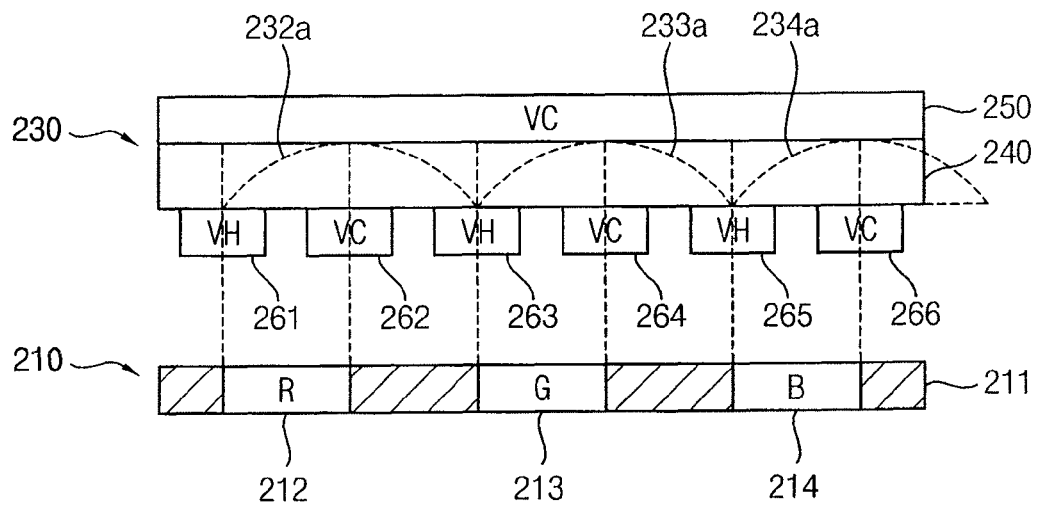
FIG. 3A is a diagram for describing an operation of a lens module included in a display device at a first frame in accordance with example embodiments.
Figure 3B:
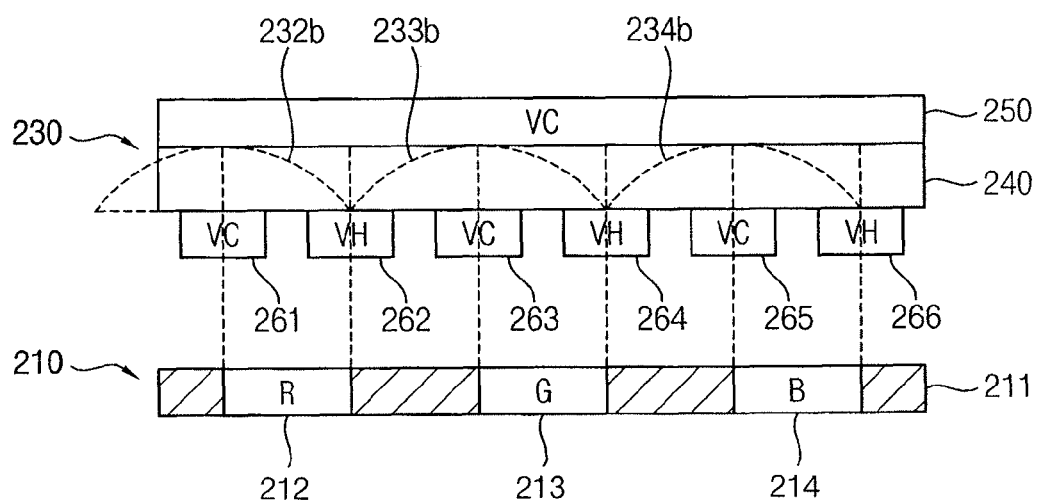
FIG. 3B is a diagram for describing an operation of a lens module included in a display device at a second frame in accordance with example embodiments.

FIG. 3A is a diagram for describing an operation of a lens module included in a display device at a first frame in accordance with example embodiments, and FIG. 3B is a diagram for describing an operation of a lens module included in a display device at a second frame in accordance with example embodiments.

Referring to FIGS. 3A and 3B, each pixel 211 of a display panel 210 may include a red sub-pixel 212, a green sub-pixel 213, and a blue sub-pixel 214. A lens module 230 may include a liquid crystal layer 240 having a plurality of liquid crystal molecules, a first electrode 250 on a first surface of the liquid crystal layer 240, and a plurality of second electrodes 261, 262, 263, 264, 265, and 266 on a second surface of the liquid crystal layer 240.

Since the liquid crystal molecules of the liquid crystal layer 240 may have optical anisotropy and polarization properties, alignment directions of the liquid crystal molecules may be changed according to an applied electric field, which results in changes of refractive indices of the liquid crystal layer 240. The liquid crystal layer 240 may adjust a path of incident light by using these characteristics of the liquid crystal molecules.

The first electrode 250 may be disposed on the first surface (e.g., an upper surface) of the liquid crystal layer 240, and may have a plate shape covering the entire first surface. The plurality of second electrodes 261, 262, 263, 264, 265 and 266 may be disposed on the second surface (e.g., a lower surface), and may have a stripe shape extending in a column direction of the display panel 210.

The lens module 230 may include two of the second electrodes 261, 262, 263, 264, 265, and 266 per one column of the sub-pixels 212, 213 and 214. That is, a ratio of the number of columns of the sub-pixels 212, 213, and 214 to the number of the plurality of second electrodes 261, 262, 263, 264, 265, and 266 may be 1:2. For example, the plurality of second electrodes 261, 262, 263, 264, 265, and 266 may include third through eighth electrodes 261, 262, 263, 264, 265, and 266 that are sequentially arranged. For example, the third electrode 261 may be disposed over a first side (e.g., a left side) of the red sub-pixel 212, the fourth electrode 262 may be disposed over a second side (e.g., a right side) of the red sub-pixel 212, the fifth electrode 263 may be disposed over a first side of green red sub-pixel 213, the sixth electrode 264 may be disposed over a second side of the green sub-pixel 213, the seventh electrode 265 may be disposed over a first side of the blue sub-pixel 214, and the eighth electrode 266 may be disposed over a second side of the blue sub-pixel 214. In other words, one sub-pixel may correspond to two second electrodes.

A lens module control unit 170 illustrated in FIG. 1 may control the lens module 230 to form a plurality of lenses 232a, 232b, 233a, 233b, 234a, and 234b by applying predetermined voltages to the first electrode 250 and the plurality of second electrodes 261, 262, 263, 264, 265, and 266.

For example, at a first frame (e.g., at an odd-numbered frame), as illustrated in FIG. 3A, the lens module control unit 170 illustrated in FIG. 1 may apply a lens driving voltage VH to odd-numbered electrodes 261, 263, and 265 of the plurality of second electrodes 261, 262, 263, 264, 265, and 266, and may apply a common voltage VC to the first electrode 250 and even-numbered electrodes 262, 264, and 266 of the plurality of second electrodes 261, 262, 263, 264, 265, and 266. The lens driving voltage VH may be a high voltage, and the common voltage VC may be a ground voltage. In this case, between the first electrode 250 and the odd-numbered second electrodes 261, 263, and 265, a strong electric field may be formed, and thus the liquid crystal layer 240 may have low refractive indices. Further, between the first electrode 250 and the even-numbered second electrodes 262, 264, and 266, an electric field may not be substantially formed, and thus the liquid crystal layer 240 may have high refractive indices. Accordingly, at the first frame, a plurality of lenses 232a, 233a, and 234a having valleys on the odd-numbered second electrodes 261, 263, and 265 may be formed, and each sub-pixel 212, 213, and 214 may be located at a left portion of a corresponding one of the plurality of lenses 232a, 233a, and 234a. For example, a first lens 232a may be formed such that the red sub-pixel 212 may be formed on a left portion of the first lens 232a, a second lens 233a may be formed such that the green sub-pixel 213 may be formed on a left portion of the second lens 233a, and a third lens 234a may be formed such that the blue sub-pixel 214 may be formed on a left portion of the third lens 234a. Accordingly, image displayed by all sub-pixels 212, 213, and 214 may be provided to a left eye of a viewer.

At a second frame (e.g., at an even-numbered frame), as illustrated in FIG. 3B, the lens module control unit 170 illustrated in FIG. 1 may apply the lens driving voltage VH to the even-numbered electrodes 262, 264, and 266 of the plurality of second electrodes 261, 262, 263, 264, 265, and 266, and may apply the common voltage VC to the first electrode 250 and the odd-numbered electrodes 261, 263, and 265 of the plurality of second electrodes 261, 262, 263, 264, 265, and 266. In this case, between the first electrode 250 and the even-numbered second electrodes 262, 264, and 266, a strong electric field may be formed, and thus the liquid crystal layer 240 may have low refractive indices. Further, between the first electrode 250 and the odd-numbered second electrodes 261, 263, and 265, an electric field may not be substantially formed, and thus the liquid crystal layer 240 may have high refractive indices. Accordingly, at the second frame, a plurality of lenses 232b, 233b, and 234b having valleys on the even-numbered second electrodes 262, 264, and 266 may be formed, and each sub-pixel 212, 213, and 214 may be located at a right portion of a corresponding one of the plurality of lenses 232a, 233a, and 234a. For example, the first lens 232a may be formed such that the red sub-pixel 212 may be formed on a right portion of the first lens 232a, the second lens 233a may be formed such that the green sub-pixel 213 may be formed on a right portion of the second lens 233a, and the third lens 234a may be formed such that the blue sub-pixel 214 may be formed on a right portion of the third lens 234a. Accordingly, image displayed by all sub-pixels 212, 213, and 214 may be provided to a right eye of the viewer.

As described above, a display device according to example embodiments may form the plurality of lenses 232a, 232b, 233a, 233b, 234a, and 234b of which positions are adjusted per frame by applying predetermined voltages to the first electrode 250 and the plurality of second electrodes 261, 262, 263, 264, 265, and 266. Further, a pitch of the plurality of lenses 232a, 232b, 233a, 233b, 234a, and 234b of the display device according to example embodiments may correspond to a half of a pitch of lenses of a conventional display device when one lens is disposed corresponding to two or more columns of sub-pixels. If the pitch is reduced to the half, an observation distance, i.e., a distance from a display device to a viewer, may be doubled. However, the display device according to example embodiments may have a cell gap (i.e., a height of the liquid crystal layer 240) corresponding to a half of a cell of the conventional display device, and thus may have an observation distance substantially the same as that of the conventional display device. Further, since the display device according to example embodiments has the cell gap reduced to the half, a response speed of the liquid crystal layer 240 may be improved, thereby improving an operating speed of the display device according to example embodiments.

Figure 4:
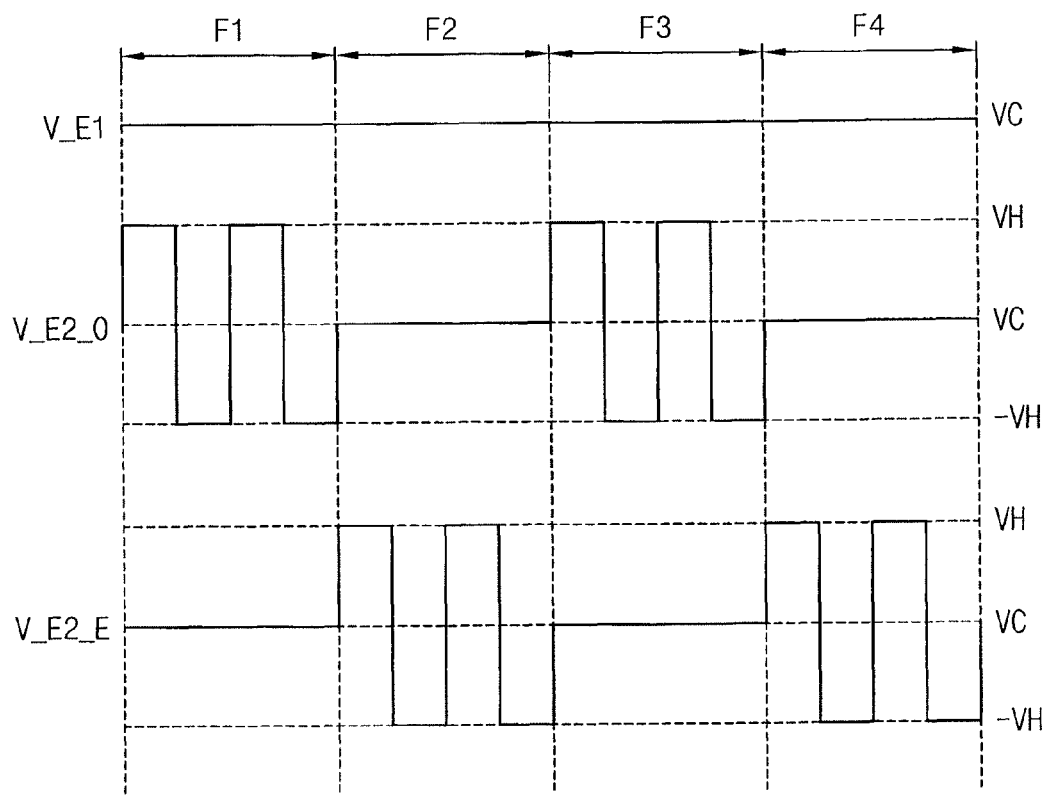
FIG. 4 is a timing diagram illustrating an example of voltages applied to a lens module included in a display device in accordance with example embodiments.

FIG. 4 is a timing diagram illustrating an example of voltages applied to a lens module included in a display device in accordance with example embodiments.

Referring to FIGS. 3A and 4, at a first frame F1, the lens module control unit 170 illustrated in FIG. 1 may apply the common voltage VC to the first electrode 250, may apply the lens driving voltage VH to the odd-numbered electrodes 261, 263, and 265 of the plurality of second electrodes 261, 262, 263, 264, 265, and 266, and may apply the common voltage VC to the even-numbered electrodes 262, 264, and 266 of the plurality of second electrodes 261, 262, 263, 264, 265, and 266. In some example embodiments, the common voltage VC may be a ground voltage, and the lens driving voltage VH may be a high voltage that periodically transitions from a positive high voltage VH to a negative high voltage (−VH) or from the negative high voltage (−VH) to the positive high voltage VH. When a voltage V_E1 of the first electrode 250 is the ground voltage, voltages V_E2_O of the odd-numbered second electrodes 261, 263, and 265 are the positive high voltage VH or the negative high voltage (−VH), and voltages V_E2_E of the even-numbered second electrodes 262, 264 and 266 are the ground voltage, a strong electric field may be formed between the first electrode 250 and the odd-numbered second electrodes 261, 263, and 265, and an electric field may not be substantially formed between the first electrode 250 and the even-numbered second electrodes 262, 264, and 266. Accordingly, at the first frame F1, a plurality of lenses 232*a*, 233*a*, and 234*a* may be formed such that each sub-pixel 212, 213, and 214 is located at a left portion of a corresponding one of the plurality of lenses 232*a*, 233*a*, and 234*a*, and thus an image displayed by all the sub-pixels 212, 213, and 214 may be provided to a left eye of a viewer.

Referring to FIGS. 3B and 4, at a second frame F2, the lens module control unit 170 illustrated in FIG. 1 may apply the common voltage VC to the first electrode 250, may apply the lens driving voltage VH to the even-numbered second electrodes 262, 264, and 266, and may apply the common voltage VC to the odd-numbered second electrodes 261, 263, and 265. When the voltage V_E1 of the first electrode 250 is the ground voltage, the voltages V_E2_E of the even-numbered second electrodes 262, 26,4 and 266 are the positive high voltage VH or the negative high voltage –VH, and the voltages V_E2_O of the odd-numbered second electrodes 261, 263, and 265 are the ground voltage, a strong electric field may be formed between the first electrode 250 and the even-numbered second electrodes 262, 264, and 266, and an electric field may not be substantially formed between the first electrode 250 and the odd-numbered second electrodes 261, 263, and 265. Accordingly, at the second frame F2, a plurality of lenses 232*b*, 233*b*, and 234*b* may be formed such that each sub-pixel 212, 213, and 214 is located at a right portion of a corresponding one of the plurality of lenses 232*b*, 233*b*, and 234*b*, and thus the image displayed by all the sub-pixels 212, 213, and 214 may be provided to a right eye of the viewer.

At subsequent frames F3 and F4, the voltage application operation at the first and second frames F1 and F2 may be repeatedly performed. For example, the lens driving voltage VH may be applied to the odd-numbered second electrodes 261, 263, and 265 at the subsequent third frame F3, and the lens driving voltage VH may be applied to the even-numbered second electrodes 262, 264, and 266 at the subsequent fourth frame F4. By periodically repeating the voltage application operation, the image displayed by all the sub-pixels 212, 213, and 214 may be provided to the left eye of the viewer at odd-numbered frames, and may be provided to the right eye of the viewer at even-numbered frames.

Figure 5:
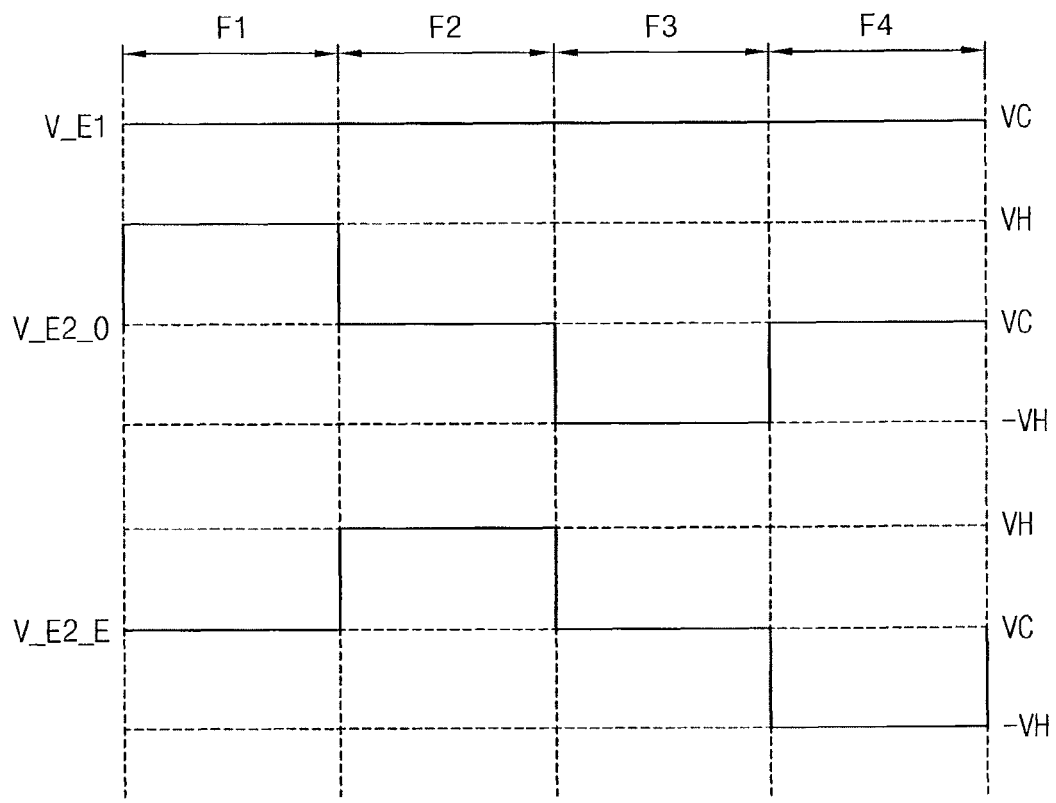
FIG. 5 is a timing diagram illustrating another example of voltages applied to a lens module included in a display device in accordance with example embodiments.

FIG. 5 is a timing diagram illustrating another example of voltages applied to a lens module included in a display device in accordance with example embodiments.

Unlike the lens driving voltage of FIG. 4 that periodically transitions from a positive high voltage VH to a negative high voltage (–VH) or from the negative high voltage (–VH) to the positive high voltage VH at each frame, a lens driving voltage illustrated in FIG. 5 may be inverted once per two frames. The period of the lens driving voltage may vary according to example embodiments.

The lens driving voltage may be applied to odd-numbered second electrodes at odd-numbered frames F1 and F3, and may be applied to even-numbered second electrodes at even-numbered frames F2 and F4. Accordingly, an image displayed by all sub-pixels may be provided to a left eye of a viewer at the odd-numbered frames F1 and F3, and may be provided to a right eye of the viewer at the even-numbered frames F2 and F4.

Figure 6B:
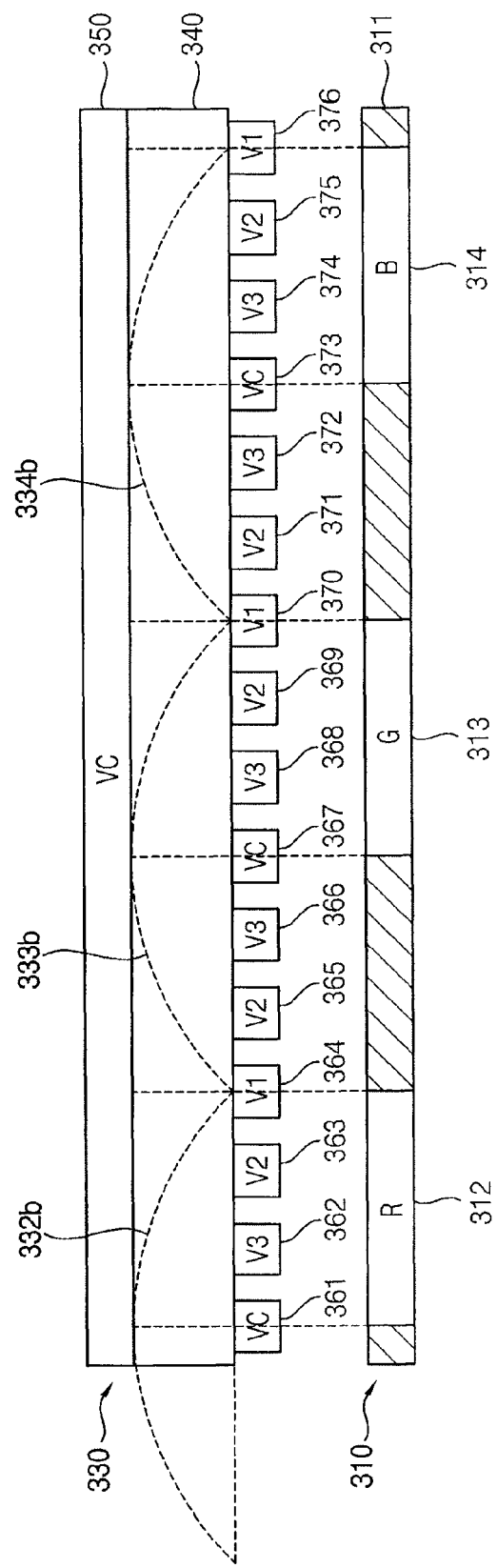
FIG. 6B is a diagram for describing an operation of a lens module included in a display device at a second frame in accordance with example embodiments.

FIG. 6A is a diagram for describing an operation of a lens module included in a display device at a first frame in accordance with example embodiments, and FIG. 6B is a diagram for describing an operation of a lens module included in a display device at a second frame in accordance with example embodiments.

Referring to FIGS. 6A and 6B, each pixel 311 of a display panel 310 may include a red sub-pixel 312, a green sub-pixel 313, and a blue sub-pixel 314. A lens module 330 may include a liquid crystal layer 340 having a plurality of liquid crystal molecules, a first electrode 350 on a first surface of the liquid crystal layer 340, and a plurality of second electrodes 361, 362, 363, 364, 365, 366, 367, 368, 369, 370, 371, 372, 373, 374, 375, and 376 on a second surface of the liquid crystal layer 340.

The lens module 330 may include two or more second electrodes 361, 362, 363, 364, 365, 366, 367, 368, 369, 370, 371, 372, 373, 374, 375, and 376 per column of the sub-pixels 312, 313, and 314. That is, a ratio of the number of columns of the sub-pixels 312, 313, and 314 to the number of the plurality of second electrodes 361, 362, 363, 364, 365, 366, 367, 368, 369, 370, 371, 372, 373, 374, 375, and 376 may be 1:N, where N is an integer greater than 1. In an example illustrated in FIGS. 6A and 6B, the lens module 330 may include six second electrodes 361, 362, 363, 364, 365, 366, 367, 368, 369, 370, 371, 372, 373, 374, 375, and 376 per column of the sub-pixels 312, 313, and 314. For example, the plurality of second electrodes 361, 362, 363, 364, 365, 366, 367, 368, 369, 370, 371, 372, 373, 374, 375, and 376 may include third through eighteenth electrodes 361, 362, 363, 364, 365, 366, 367, 368, 369, 370, 371, 372, 373, 374, 375 and 376, the third through eighth electrodes 361, 362, 363, 364, 365, and 366 may be sequentially arranged from a first side (e.g., a left side) of the red sub-pixel 312, the ninth through fourteenth electrodes 367, 368, 369, 370, 371, and 372 may be sequentially arranged from a first side of the green sub-pixel 313, and the fifteenth through eighteenth electrodes 373, 374, 375, and 376 may be sequentially arranged from a first side of the blue sub-pixel 314.

The lens module control unit 170 illustrated in FIG. 1 may control the lens module 330 to form a plurality of lenses 332*a*, 332*b*, 333*a*, 333*b*, 334*a*, and 334*b* by applying predetermined voltages to the first electrode 350 and the plurality of second electrodes 361, 362, 363, 364, 365, 366, 367, 368, 369, 370, 371, 372, 373, 374, 375, and 376.

For example, at a first frame (e.g., at an odd-numbered frame), as illustrated in FIG. 6A, the lens module control unit 170 illustrated in FIG. 1 may apply the common voltage VC to the first electrode 350, may apply a first lens driving voltage V1 to the third, ninth, and fifteenth electrodes 361, 367, and 373 located at the first sides (e.g., left sides) of respective pixels 312, 313, and 314, and may apply the common voltage VC to the sixth, twelfth, and eighteenth electrodes 364, 370, and 376 located at the second sides (e.g., right sides) of respective pixels 312, 313, and 314. Further, the lens module control unit 170 illustrated in FIG. 1 may apply a second lens driving voltage V2 to the fourth, eighth, tenth, fourteenth, and sixteenth electrodes 362, 366, 368, 372, and 374 adjacent to the third, ninth, and fifteenth electrodes 361, 367, and 373, and may apply a third lens driving voltage V3 to the fifth, seventh, eleventh, thirteenth, and seventeenth electrodes 363, 365, 369, 371, and 375 adjacent to the sixth, twelfth, and eighteenth electrodes 364, 370, and 376. For example, the common voltage VC may be a ground voltage, the first lens driving voltage V1 may be a high voltage, the second lens driving voltage V2 may be lower than the first lens driving voltage V1, and the third lens driving voltage V3 may be lower than the second lens driving voltage V2 and higher than the ground voltage.

In this case, since a strong electric field may be formed between the first electrode 350 and the third, ninth, and fifteenth electrodes 361, 367, and 373, and an electric field may not be substantially formed between the first electrode 350 and the sixth, twelfth, and eighteenth electrodes 364, 370, and 376, a plurality of lenses 332a, 333a, and 334a having valleys on the third, ninth, and fifteenth electrodes 361, 367, and 373, and each sub-pixel 312, 313, and 314 may be located at a left portion of a corresponding one of the plurality of lenses 332a, 333a, and 334a. Accordingly, an image displayed by all sub-pixels 312, 313, and 314 may be provided to a left eye of a viewer. Further, since the second and third lens driving voltages V2 and V3 lower than the first lens driving voltage V1 and higher than the ground voltage are applied to the fourth, fifth, seventh, eighth, tenth, eleventh, thirteenth, fourteenth, sixteenth, and seventeenth electrodes 362, 363, 365, 366, 368, 369, 371, 372, 374, and 375 between the third, ninth, and fifteenth electrodes 361, 367, and 373 and the sixth, twelfth, and eighteenth electrodes 364, 370 and 376, the plurality of lenses 332a, 333a, and 334a may have smooth curves.

At a second frame (e.g., at an even-numbered frame), as illustrated in FIG. 6B, the lens module control unit 170 illustrated in FIG. 1 may apply the common voltage VC to the first electrode 350, may apply the first lens driving voltage V1 to the sixth, twelfth and eighteenth electrodes 364, 370, and 376 located at the second sides of respective pixels 312, 313, and 314, and may apply the common voltage VC to the third, ninth and fifteenth electrodes 361, 367, and 373 located at the first sides of respective pixels 312, 313, and 314. Further, the lens module control unit 170 illustrated in FIG. 1 may apply the second lens driving voltage V2 to the fifth, seventh, eleventh, thirteenth and seventeenth electrodes 363, 365, 369, 371, and 375 adjacent to the sixth, twelfth and eighteenth electrodes 364, 370, and 376, and may apply the third lens driving voltage V3 to the fourth, eighth, tenth, fourteenth and sixteenth electrodes 362, 366, 368, 372, and 374 adjacent to the third, ninth and fifteenth electrodes 361, 367, and 373.

In this case, since a strong electric field may be formed between the first electrode 350 and the sixth, twelfth and eighteenth electrodes 364, 370 and 376, and an electric field may not be substantially formed between the first electrode 350 and the third, ninth, and fifteenth electrodes 361, 367, and 373, a plurality of lenses 332b, 333b, and 334b having valleys on the sixth, twelfth, and eighteenth electrodes 364, 370, and 376, and each sub-pixel 312, 313, and 314 may be located at a right portion of a corresponding one of the plurality of lenses 332b, 333b, and 334b. Accordingly, the image displayed by all sub-pixels 312, 313, and 314 may be provided to a right eye of the viewer. Further, since the second and third lens driving voltages V2 and V3 lower than the first lens driving voltage V1 and higher than the ground voltage are applied to the fourth, fifth, seventh, eighth, tenth, eleventh, thirteenth, fourteenth, sixteenth, and seventeenth electrodes 362, 363, 365, 366, 368, 369, 371, 372, 374, and 375 between the third, ninth, and fifteenth electrodes 361, 367, and 373 and the sixth, twelfth, and eighteenth electrodes 364, 370, and 376, the plurality of lenses 332b, 333b, and 334b may have smooth curves.

As described above, a display device according to example embodiments may form the plurality of lenses 332a, 332b, 333a, 333b, 334a, and 334b of which a pitch corresponds to a horizontal pitch of the sub-pixels 312, 313 and 314, and of which positions are adjusted per frame by applying predetermined voltages to the first electrode 350 and the plurality of second electrodes 361, 362, 363, 364, 365, 366, 367, 368, 369, 370, 371, 372, 373, 374, 375, and 376. Accordingly, the display device according to example embodiments may display a stereoscopic image with a high resolution. Further, the display device according to example embodiments may reduce a cell gap (or a height of the liquid crystal layer 340) to the half compared with a conventional display device, and thus may have a high operating speed while maintaining an observation distance.

Figure 7:
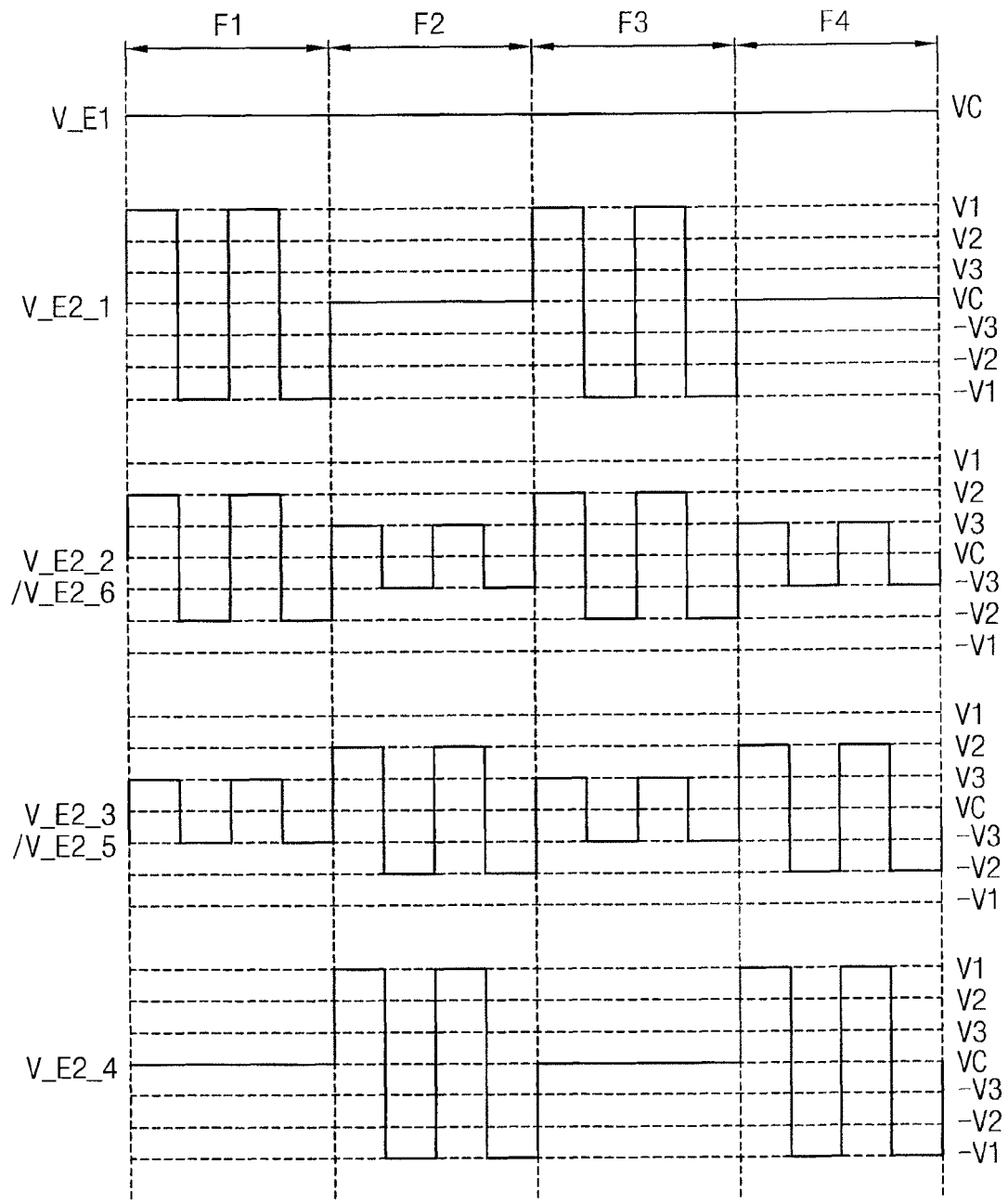
FIG. 7 is a timing diagram illustrating an example of voltages applied to a lens module included in a display device in accordance with example embodiments.

FIG. 7 is a timing diagram illustrating an example of voltages applied to a lens module included in a display device in accordance with example embodiments.

Referring to FIGS. 6A and 7, at a first frame F1, a lens module control unit 170 illustrated in FIG. 1 may apply the common voltage VC to the first electrode 350, may apply a first lens driving voltage V1 to third, ninth, and fifteenth electrodes 361, 367, and 373 located at first sides (e.g., left sides) of respective pixels 312, 313, and 314 among a plurality of second electrodes 361, 362, 363, 364, 365, 366, 367, 368, 369, 370, 371, 372, 373, 374, 375, and 376, and may apply the common voltage VC to sixth, twelfth, and eighteenth electrodes 364, 370, and 376 located at second sides (e.g., right sides) of respective pixels 312, 313, and 314 among a plurality of second electrodes 361, 362, 363, 364, 365, 366, 367, 368, 369, 370, 371, 372, 373, 374, 375, and 376. Further, the lens module control unit 170 illustrated in FIG. 1 may apply a second lens driving voltage V2 to fourth, eighth, tenth, fourteenth, and sixteenth electrodes 362, 366, 368, 372, and 374 adjacent to the third, ninth, and fifteenth electrodes 361, 367, and 373, and may apply a third lens driving voltage V3 to fifth, seventh, eleventh, thirteenth, and seventeenth electrodes 363, 365, 369, 371, and 375 adjacent to the sixth, twelfth, and eighteenth electrodes 364, 370, and 376. The common voltage VC may be a ground voltage, the first lens driving voltage V1 may be a high voltage, the second lens driving voltage V2 may be lower than the first lens driving voltage V1, and the third lens driving voltage V3 may be lower than the second lens driving voltage V2 and higher than the ground voltage. In some example embodiments, each of the first through third lens driving voltages V1, V2, and V3 may periodically transitions from a positive voltage to a negative voltage or from the negative voltage to the positive voltage. When a voltage V_E1 of the first electrode 350 is the ground voltage, voltages V_E2_1 of the third, ninth, and fifteenth electrodes 361, 367, and 373 are the first lens driving voltage V1, voltages V_E2_2 of the fourth, tenth, and sixteenth electrodes 362, 368, and 374 are the second lens driving voltage V2, voltages V_E2_3 of the fifth, eleventh, and seventeenth electrodes 363, 369, and 375 are the third lens driving voltage V3, voltages V_E2_4 of the sixth, twelfth, and eighteenth electrodes 364, 370, and 376 are the ground voltage, voltages V_E2_5 of the seventh and thirteenth electrodes 365 and 371 are the third lens driving voltage V3, and voltages V_E2_6 of the eighth and fourteenth electrodes 366 and 372 are the second lens driving voltage V2, a plurality of lenses 332a, 333a, and 334a having valleys on the third, ninth, and fifteenth electrodes 361, 36,7 and 373 may be formed with smooth curves. Accordingly, each sub-pixel 312, 313, and 314 is located at a left portion of a corresponding one of the plurality of lenses 332a, 333a, and 334a, and thus an image displayed by all the sub-pixels 312, 313, and 314 may be provided to a left eye of a viewer.

Referring to FIGS. 6B and 7, at a second frame F2, the lens module control unit 170 illustrated in FIG. 1 may apply the common voltage VC to the first electrode 350, may apply the first lens driving voltage V1 to the sixth, twelfth, and eighteenth electrodes 364, 370, and 376 located at the second sides of respective pixels 312, 313 and 314, and may apply the common voltage VC to the third, ninth, and fifteenth electrodes 361, 367, and 373 located at the first sides of respective pixels 312, 313, and 314. Further, the lens module control unit 170 illustrated in FIG. 1 may apply the second lens driving voltage V2 to the fifth, seventh, eleventh, thirteenth, and seventeenth electrodes 363, 365, 369, 371, and 375, and may apply the third lens driving voltage V3 to the fourth, eighth, tenth, fourteenth, and sixteenth electrodes 362, 366, 368, 372, and 374. When the voltage V_E1 of the first electrode 350 is the ground voltage, the voltages V_E2_1 of the third, ninth, and fifteenth electrodes 361, 367, and 373 are the ground voltage, the voltages V_E2_2 of the fourth, tenth, and sixteenth electrodes 362, 368, and 374 are the third lens driving voltage V3, the voltages V_E2_3 of the fifth, eleventh, and seventeenth electrodes 363, 369, and 375 are the second lens driving voltage V2, the voltages V_E2_4 of the sixth, twelfth, and eighteenth electrodes 364, 370, and 376 are the first lens driving voltage V1, the voltages V_E2_5 of the seventh and thirteenth electrodes 365 and 371 are the second lens driving voltage V2, and the voltages V_E2_6 of the eighth and fourteenth electrodes 366 and 372 are the third lens driving voltage V3, a plurality of lenses 332b, 333b, and 334b having valleys on the sixth, twelfth, and eighteenth electrodes 364, 370, and 376 may be formed with smooth curves. Accordingly, each sub-pixel 312, 313, and 314 is located at a right portion of a corresponding one of the plurality of lenses 332b, 333b, and 334b, and thus the image displayed by all the sub-pixels 312, 313, and 314 may be provided to a right eye of the viewer.

At subsequent frames F3 and F4, the voltage application operation at the first and second frames F1 and F2 may be repeatedly performed. By periodically repeating the voltage application operation, the image displayed by all the sub-pixels 312, 313, and 314 may be provided to the left eye of the viewer at odd-numbered frames, and may be provided to the right eye of the viewer at even-numbered frames.

Figure 8:
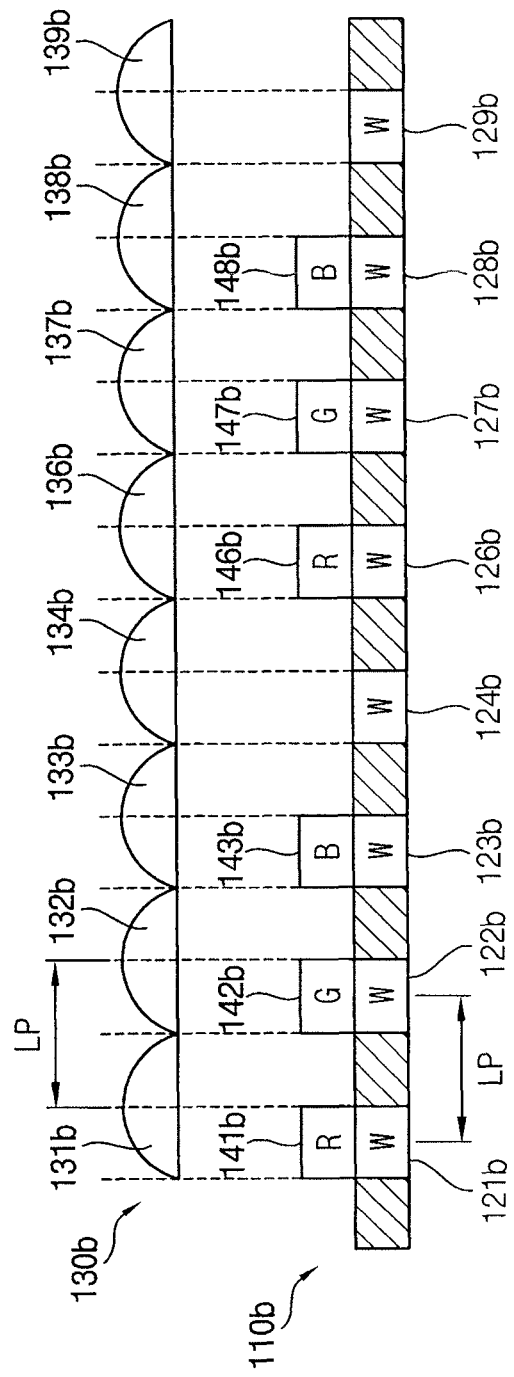
FIG. 8 is a diagram illustrating a display panel and a lens module included in a display device in accordance with example embodiments.

FIG. 8 is a diagram illustrating a display panel and a lens module included in a display device in accordance with example embodiments.

Referring to FIG. 8, a display panel 110b may include a plurality of pixels. Unlike each pixel 111a and 116a illustrated in FIGS. 2A and 2B which includes organic light emitting diodes emitting red light, green light and blue light, each pixel of the display panel 110b may include organic light emitting diodes 121b, 122b, 123b, 124b, 126b, 127b, 128b, and 129b, that emit white light and color filters 141b, 142b, 143b, 146b, 147b, and 148b. For example, each pixel may include a red sub-pixel having a first organic light emitting diode 121b and 126b that emits white light and a red filter 141b and 146b, a green sub-pixel having a second organic light emitting diode 122b and 127b that emits white light and a green filter 142b and 147b, and a blue sub-pixel having a third organic light emitting diode 123b and 128b that emits white light and a green filter 143b and 148b. In some example embodiments, each pixel may further include a white sub-pixel having a fourth organic light emitting diode 124b and 129b on which no color filter is formed.

A lens module 130b may include a plurality of lenses 131b, 132b, 133b, 134b, 135b, 136b, 137b, and 138b that extend in a column direction of the display panel 110b and are disposed parallel to each other. A pitch LP of the plurality of lenses 131b, 132b, 133b, 134b, 135b, 136b, 137b, and 138b may correspond to a horizontal pitch SP of the sub-pixels, and one lens may be disposed corresponding to one column of the sub-pixels.

In a display device according to example embodiments, the plurality of lenses 131b, 132b, 133b, 134b, 135b, 136b, 137b, and 138b may have the pitch LP corresponding to the horizontal pitch SP of the sub-pixels, and positions of the plurality of lenses 131b, 132b, 133b, 134b, 135b, 136b, 137b, and 138b may be adjusted per frame. Accordingly, the display device according to example embodiments may display a stereoscopic image with a high resolution.

Figure 9A:
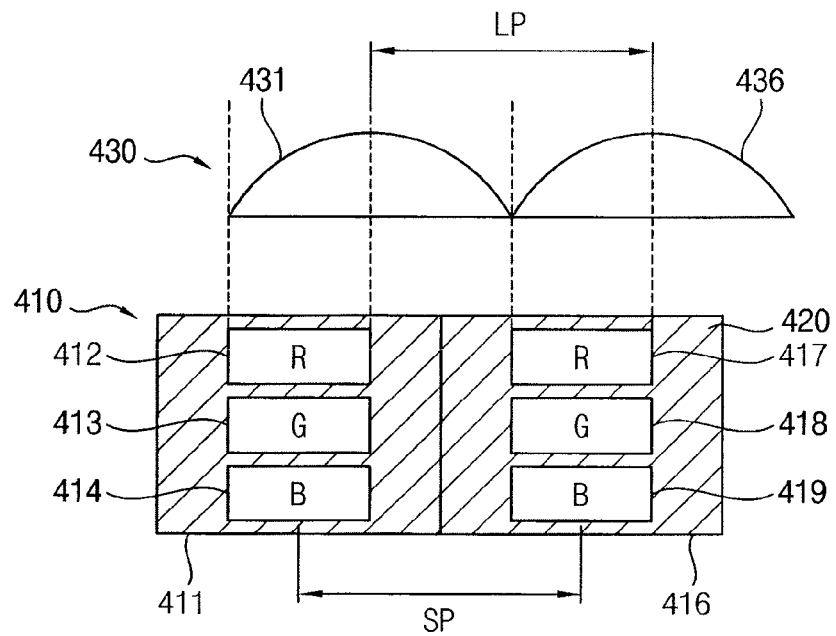
FIG. 9A is a diagram for describing an operation of a display device at a first frame in accordance with example embodiments.
Figure 9B:
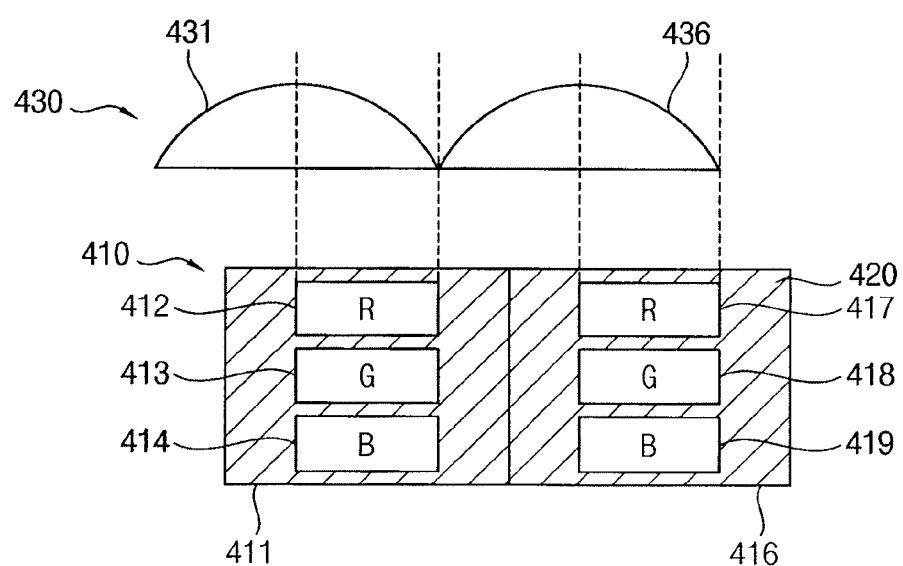
FIG. 9B is a diagram for describing an operation of a display device at a second frame in accordance with example embodiments.

FIG. 9A is a diagram for describing an operation of a display device at a first frame in accordance with example embodiments, and FIG. 9B is a diagram for describing an operation of a display device at a second frame in accordance with example embodiments.

Referring to FIGS. 9A and 9B, a display panel 410 may include a plurality of pixels 411 and 416. Each pixel 411 and 416 may include a plurality of sub-pixels 412, 413, 414, 417, 418, and 419. Unlike a plurality of sub-pixels 112a, 113a, 114a, 117a, 118a, and 119a illustrated in FIGS. 2A and 2B of which long sides extend in a column direction of a display panel 110a and short sides extend in a row direction of the display panel 110a, long sides of the plurality of sub-pixels 412, 413, 414, 417, 418, and 419 may extend in a row direction of the display panel 410, and short sides of the plurality of sub-pixels 412, 413, 414, 417, 418, and 419 may extend in a column direction of the display panel 410. In this case, a horizontal pitch SP of the sub-pixels 412, 413, 414, 417, 418, and 419 may correspond to a sum of a gap between two horizontally adjacent sub-pixels (or a length of the black matrix region 420 between two horizontally adjacent sub-pixels) and a length of the long side of one sub-pixel. In some example embodiments, the gap between two horizontally adjacent sub-pixels may be substantially the same as the length of the long side of one sub-pixel, or may be longer than the length of the long side of one sub-pixel.

A lens module 430 may include a plurality of lenses 431 and 436 that extend in a column direction of the display panel 410 and are disposed parallel to each other. A pitch LP of the plurality of lenses 431, and 436 may correspond to the horizontal pitch SP of the sub-pixels 412, 413, 414, 417, 418, and 419, and one lens may be disposed corresponding to one column of the sub-pixels 412, 413, 414, 417, 418, and 419.

At a first frame (e.g., at an odd-numbered frame), as illustrated in FIG. 9A, positions of the plurality of lenses 431 and 436 may be adjusted such that each sub-pixel 412, 413, 414, 417, 418, and 419 is located at a left portion of a corresponding one of the plurality of lenses 431 and 436. At a second frame (e.g., at an even-numbered frame), as illustrated in FIG. 9B, the positions of the plurality of lenses 431 and 436 may be adjusted such that each sub-pixel 412, 413, 414, 417, 418, and 419 is located at a right portion of the corresponding one of the plurality of lenses 431 and 436. Accordingly, an image displayed by all the sub-pixels 412, 413, 414, 417, 418, and 419 may be provided to a left eye of a viewer at the first frame, and may be provided to a right eye of the viewer at the second frame.

In a display device according to example embodiments, the plurality of lenses 431 and 436 may have the pitch LP corresponding to the horizontal pitch SP of the sub-pixels 412, 413, 414, 417, 418, and 419, and positions of the plurality of lenses 431 and 436 may be adjusted per frame. Accordingly, the display device according to example embodiments may display a stereoscopic image with a high resolution.

Figure 10:
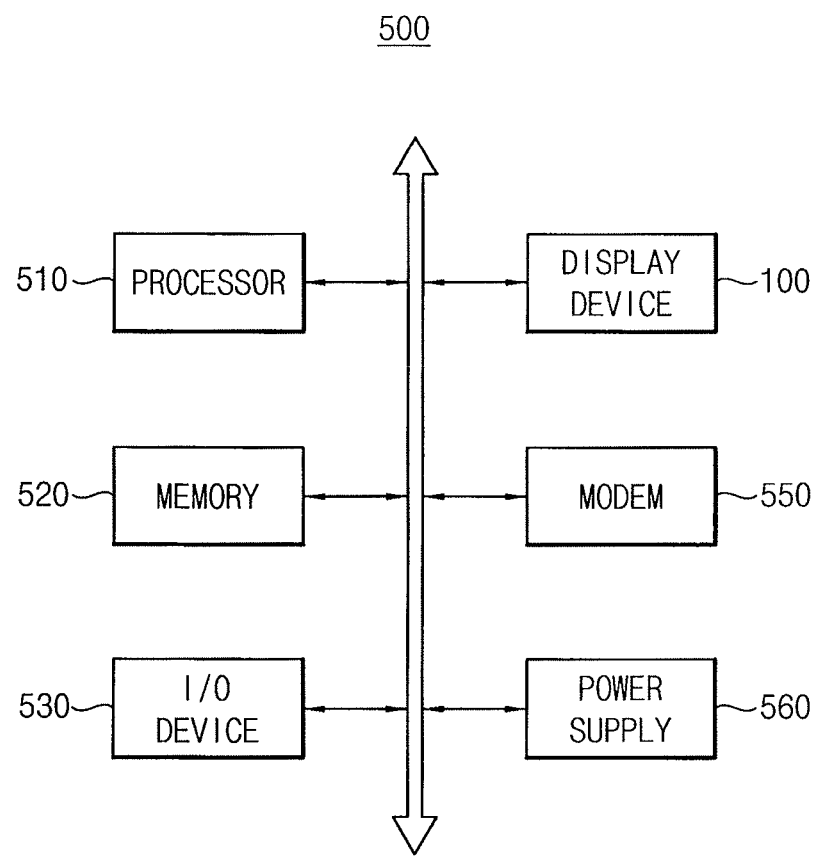
FIG. 10 is a block diagram illustrating a computing system including a display device in accordance with example embodiments.

FIG. 10 is a block diagram illustrating a computing system including a display device in accordance with example embodiments.

Referring to FIG. 10, a computing system 500 includes a processor 510 and a display device 100. In some example embodiments, the computing system 500 may further include a memory device 520, an input/output device 530, a modem 550 and a power supply 560.

The processor 510 may perform specific calculations or tasks. For example, the processor 510 may be a mobile system-on-chip (SOC), an application processor, a media processor, a microprocessor, a central process unit (CPU), a digital signal processor, or the like. The processor 510 may be coupled to the memory device 520 via an address bus, a control bus and/or a data bus. For example, the memory device 520 may be implemented by a dynamic random access memory (DRAM), a mobile DRAM, a static random access memory (SRAM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc. Further, the processor 510 may be coupled to an extension bus, such as a peripheral component interconnect (PCI) bus. The processor 510 may control the input/output device 530 including an input device, such as a keyboard, a mouse, a keypad, etc., and an output device, such as a printer, a display device, etc. via the extension bus. The display device 100 may display a stereoscopic image with a high resolution using a lens module including a plurality of lenses having a pitch corresponding to a horizontal pitch of sub-pixels.

Further, the processor 510 may control a storage device, such as a solid state drive, a hard disk drive, a CD-ROM, etc. via the extension bus. The modem 550 may perform wired or wireless communications with an external device. The power supply 560 may supply power to the computing system 500. In some example embodiments, the computing system 500 may further include an application chipset, a camera image processor (CIS), etc.

According to example embodiments, the computing system 500 may be any computing system including the display device 100, such as a digital television (TV), a 3D TV, a personal computer (PC), a home appliance, a laptop computer, a tablet computer, a mobile phone, a smart phone, a personal digital assistant (PDA), a portable multimedia player (PMP), a digital camera, a music player, a portable game console, a navigation device, etc.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A display device, comprising:
    a display panel including a plurality of pixels arranged in a matrix form, each pixel including a plurality of sub-pixels;
    a lens module on the display panel, the lens module including a plurality of lenses having a pitch that corresponds to a horizontal pitch of the plurality of sub-pixels; and
    a driving unit configured to drive the display panel and the lens module to provide an image displayed by the display panel to a left eye of a viewer at a first frame and to provide the image displayed by the display panel to a right eye of the viewer at a second frame.

2. The display device of claim 1, wherein the driving unit includes:
    a display driving unit configured to drive the display panel to display a left eye image at the first frame, and to drive the display panel to display a right eye image at the second frame; and
    a lens module control unit configured to control the lens module such that each sub-pixel is located at a left portion of a corresponding one of the plurality of lenses at the first frame, and to control the lens module such that each sub-pixel is located at a right portion of the corresponding one of the plurality of lenses at the second frame.

3. The display device of claim 1, wherein the lens module further comprises:
    a liquid crystal layer including a plurality of liquid crystal molecules;
    a first electrode disposed on a first surface of the liquid crystal layer; and
    a plurality of second electrodes disposed on a second surface of the liquid crystal layer, the plurality of second electrodes extending in a column direction of the display panel.

4. The display device of claim 3, wherein a ratio of a number of columns of the plurality of sub-pixels to a number of second electrodes is 1:2.

5. The display device of claim 4, wherein a lens driving voltage is applied to odd-numbered electrodes of the plurality of second electrodes at the first frame, and is applied to even-numbered electrodes of the plurality of second electrodes at the second frame.

6. The display device of claim 5, wherein a ground voltage is applied to the first electrode and the even-numbered electrodes of the plurality of second electrodes at the first frame, and is applied to the first electrode and the odd-numbered electrodes of the plurality of second electrodes at the second frame.

7. The display device of claim 5, wherein the lens driving voltage periodically transitions from a positive high voltage to a negative high voltage or from the negative high voltage to the positive high voltage.

8. The display device of claim 3, wherein a ratio of a number of columns of the plurality of sub-pixels to a number of second electrodes is 1:N, where N is an integer greater than 1.

9. The display device of claim 8, wherein:
    the plurality of second electrodes includes at least one third electrode located corresponding to a first side of each sub-pixel, at least one fourth electrode located corresponding to a second side of each sub-pixel, and at least one fifth electrode located between the at least one third electrode and the at least one fourth electrode,
    at the first frame, a lens driving voltage is applied to the at least one third electrode, a ground voltage is applied to the at least one fourth electrode, and a voltage higher than the ground voltage and lower than the lens driving voltage is applied to the at least one fifth electrode, and
    at the second frame, the ground voltage is applied to the at least one third electrode, the lens driving voltage is applied to the at least one fourth electrode, and the voltage higher than the ground voltage and lower than the lens driving voltage is applied to the at least one fifth electrode.

10. The display device of claim 1, wherein the plurality of sub-pixels is arranged such that a long side of each sub-pixel extends in a column direction of the display panel and a short side of each sub-pixel extends in a row direction of the display panel.

11. The display device of claim 1, wherein the plurality of sub-pixels are arranged such that a long side of each sub-pixel extends in a row direction of the display panel and a short side of each sub-pixel extends in a column direction of the display panel.

12. The display device of claim 1, wherein each of the plurality of pixels includes:
   a red sub-pixel including an organic light emitting diode that emits red light;
   a green sub-pixel including an organic light emitting diode that emits green light; and
   a blue sub-pixel including an organic light emitting diode that emits blue light.

13. The display device of claim 1, wherein each of the plurality of pixels includes:
   a red sub-pixel including a first organic light emitting diode that emits white light and a red filter;
   a green sub-pixel including a second organic light emitting diode that emits white light and a green filter; and
   a blue sub-pixel including a third organic light emitting diode that emits white light and a blue filter.

14. The display device of claim 1, wherein each of the plurality of pixels includes:
   a red sub-pixel including a first organic light emitting diode that emits white light and a red filter;
   a green sub-pixel including a second organic light emitting diode that emits white light and a green filter;
   a blue sub-pixel including a third organic light emitting diode that emits white light and a blue filter; and
   a white sub-pixel including a fourth organic light emitting diode that emits white light.

15. A display device, comprising:
   a display panel including a plurality of pixels arranged in a matrix form, each pixel including a plurality of sub-pixels;
   a lens module on the display panel, the lens module including:
      a liquid crystal layer having a plurality of liquid crystal molecules,
      a first electrode on a first surface of the liquid crystal layer, and
      a plurality of second electrodes on a second surface of the liquid crystal layer, the plurality of second electrodes extending in a column direction of the display panel;
   a display driving unit configured to drive the display panel to display a left eye image at a first frame, and to drive the display panel to display a right eye image at a second frame; and
   a lens module control unit configured to apply a lens driving voltage to electrodes located in correspondence to first sides of the plurality of sub-pixels among the plurality of second electrodes, and to apply the lens driving voltage to electrodes located in correspondence to second sides of the plurality of sub-pixels among the plurality of second electrodes.

16. The display device of claim 15, wherein the lens module control unit is configured to control the lens module such that the lens module has a plurality of lenses having a pitch corresponding to a horizontal pitch of the plurality of sub-pixels.

17. The display device of claim 16, wherein a ratio of a number of columns of the plurality of sub-pixels to a number of the plurality of second electrodes is 1:N, where N is an integer greater than 1.

18. The display device of claim 15, wherein the plurality of sub-pixels is arranged such that a long side of each sub-pixel extends in a column direction of the display panel and a short side of each sub-pixel extends in a row direction of the display panel.

19. The display device of claim 15, wherein the plurality of sub-pixels are arranged such that a long side of each sub-pixel extends in a row direction of the display panel and a short side of each sub-pixel extends in a column direction of the display panel.

* * * * *